W. SAVIDGE.
TRACTOR.
APPLICATION FILED AUG. 16, 1916.
1,240,782.  Patented Sept. 18, 1917.
3 SHEETS—SHEET 3.
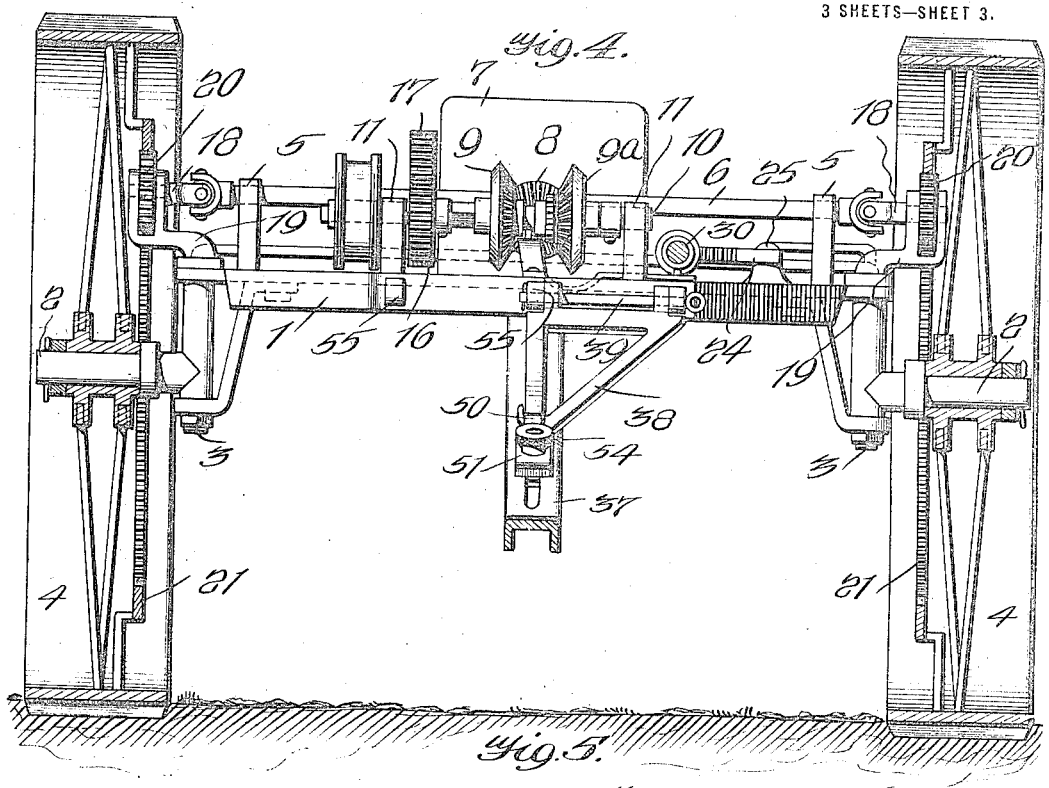
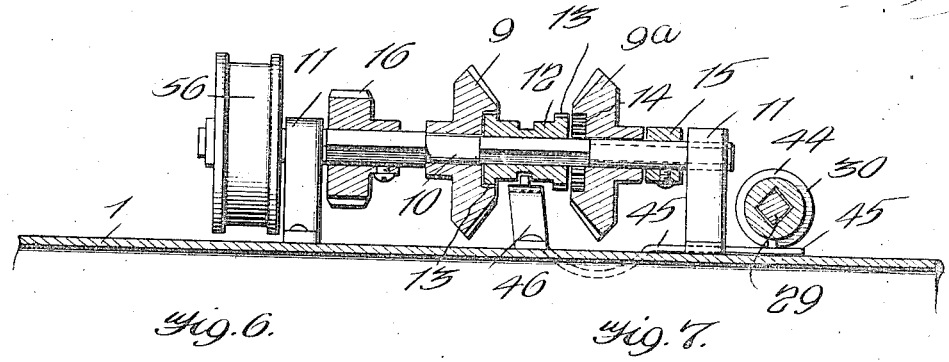
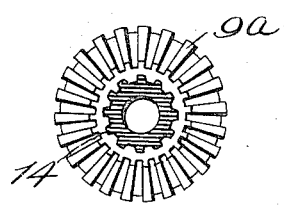
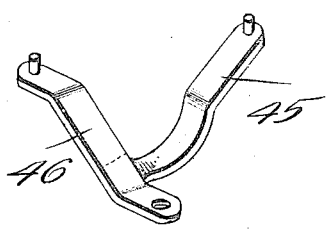
WITNESSES
INVENTOR
WILLIAM SAVIDGE,
BY
ATTORNEYS

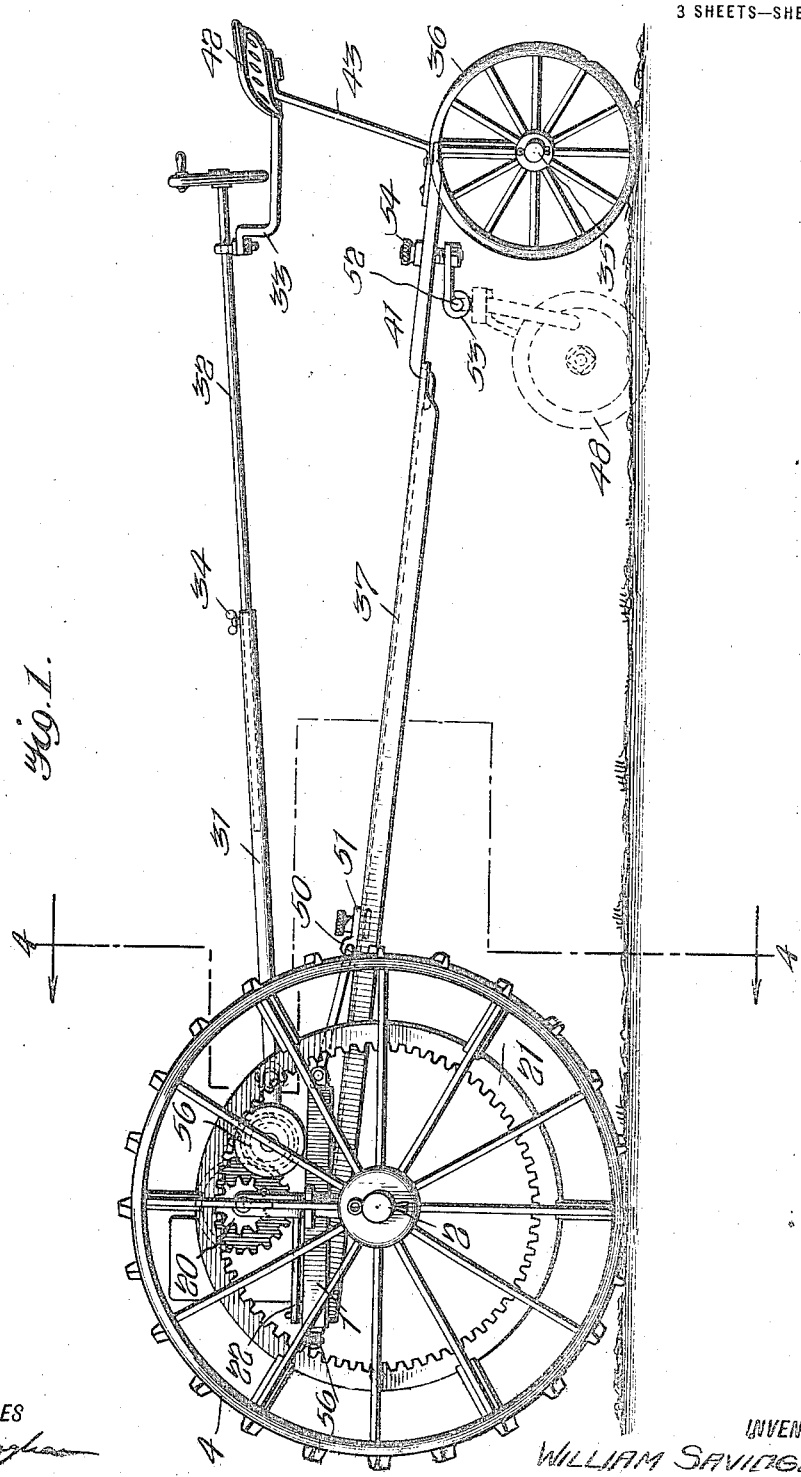

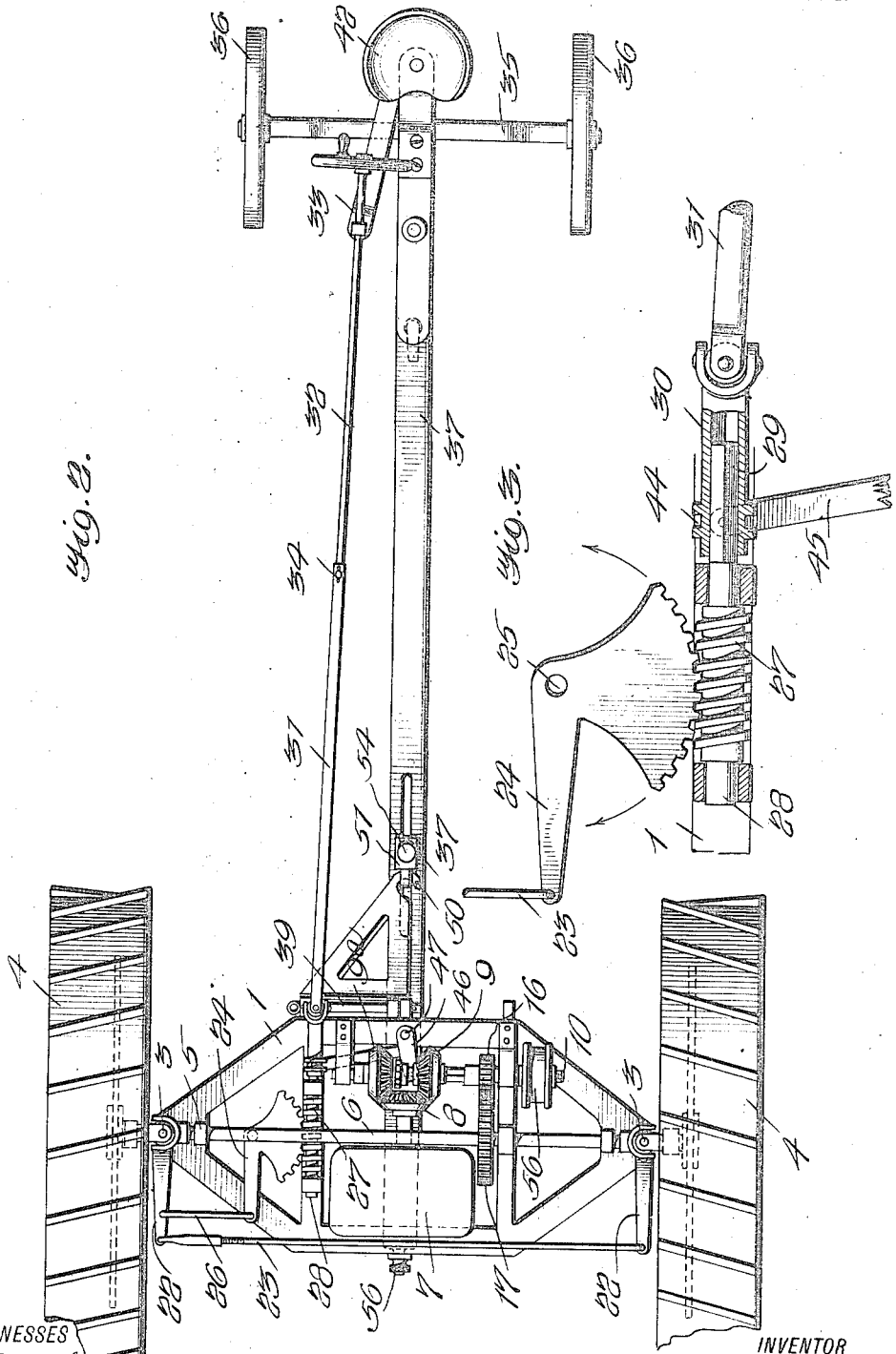

UNITED STATES PATENT OFFICE.

WILLIAM SAVIDGE, OF ALTON, ILLINOIS.

TRACTOR.

1,240,782.  Specification of Letters Patent.  Patented Sept. 18, 1917.

Application filed August 16, 1916. Serial No. 115,250.

*To all whom it may concern:*

Be it known that I, WILLIAM SAVIDGE, a citizen of the United States, and a resident of Alton, in the county of Madison and State of Illinois, have invented new and useful Improvements in Tractors, of which the following is a specification.

My invention is an improvement in tractors and has for its object to provide a three wheel tractor, wherein the tractor comprises a supporting frame with spindles connected to the ends thereof to swing laterally and upon which the power wheels are journaled, the frame supporting a driving shaft and a motor which drives the driving shaft in either direction, and the said shaft being connected to the power wheels to drive the same from near the centers thereof, the frame having an adjustable reach or draw bar for connection with the machine or vehicle to be drawn, and wherein steering mechanism and the reversing mechanism for the tractor is arranged to be controlled from a trailing truck, or from the machine or vehicle, being operated by means of a single steering post.

In the drawings:

Figure 1 is a side view of the improved tractor,

Fig. 2 is a top plan view,

Fig. 3 is an enlarged detail section of a portion of the steering mechanism,

Fig. 4 is a section on the line 4—4 of Fig. 1, looking in the direction of the arrows adjacent to the line, Fig. 5 is an enlarged section through the clutch mechanism, Fig. 6 is a face view of one of the bevel gears, and Fig. 7 is a perspective view of the supporting bracket for the front end of the reach bar.

In the present embodiment of the invention, the front or power truck consists of a substantially diamond shaped frame 1 having spindles 2 pivoted to the ends thereof as indicated at 3, to permit the spindles to swing with respect to the axle, and upon each spindle is a power or traction wheel 4. The frame is provided with bearings for receiving the power shaft 6, and the motor 7 is mounted on the frame, as is also a clutch mechanism for connecting the motor with the driving shaft. The motor shaft is provided with a bevel gear 8 which extends between a pair of bevel gears 9 and $9^a$, which are journaled loosely on a counter-shaft 10. The counter-shaft is journaled in bearing brackets 11 on the frame 1. Between the bevel gears 9 and $9^a$, the counter-shaft is polygonal in cross section, and a clutch sleeve 12 is mounted to slide on this polygonal portion. The said sleeve is provided at each end with an annular series of gear teeth 13, as shown, and each series of teeth is designed to engage with an internal series 14 in a recess of the adjacent double gear 9 or $9^a$, as the case may be, to clutch the bevel gear to the shaft.

A stop collar 15 is arranged on the counter-shaft outside of the bevel gear $9^a$ and is held to the shaft by a set screw as shown, and outside of the bevel gear 9 the shaft is enlarged and polygonal, and the annular shoulder formed between the enlarged polygonal portion and the body of the shaft limits the outward movement of the gear 9. A pinion 16 is mounted on this polygonal portion of the shaft and is held from longitudinal movement by a set screw, as shown, and the said pinion meshes with a gear wheel 17 on the driving shaft 6. A spindle 18 is connected to each end of the shaft 6 by means of a universal joint connection as shown, and each spindle is journaled in the arms of a fork 19 on the upper end of the journal pin 3 which connects the spindles 2 to the frame 1.

A pinion 20 is secured to each spindle between the arms of the fork, and each pinion meshes with an internal gear ring 21 secured within the adjacent wheel 4. Thus it will be evident that when the power shaft 6 is rotated through either bevel gear 9 or $9^a$, the pinions 20 will be rotated and in turn will drive the power or traction wheels 4. Since the pinions 20 are supported by the forks of the pivots 3 upon which the spindles 2 turn, the said pinions 20 will always mesh properly with the gear rings 21. Each pivot pin 3 is provided with a forwardly extending arm 22, and these arms are connected by a link 23, the said link being adjustable in length, as shown. The wheels are swung in unison by means of an elbow lever 24 which is pivoted to the frame as indicated at 25, and one arm of the elbow lever is connected by a link 26 with the adjacent arm 22. The other arm of the lever is a gear segment, and meshes with a worm 27 on a steering shaft 28 journaled in bearings on the frame 1.

A steering post, to be described, is connected with the shaft 28. It will be evident that when the said shaft is turned, the wheels will be simultaneously moved in the same direction. The worm shaft 28 is provided with a polygonal extension 29 which fits within a similarly shaped socket 30, whose outer end is connected by a universal joint, with the outer section 31 of the telescopic steering post. The inner section 32 of the said post is mounted to slide in the outer section and is journaled in a bracket 33 on the rear truck, to be later described, and is provided with a steering wheel for operating the post. The sections 31 and 32 are held in adjusted position with respect to each other by a set screw 34.

The rear truck consists of an arched axle 35 having upon the ends thereof wheels 36, and the axle is connected to the front truck by means of a reach bar 37. The rear wheels 36 are of much smaller diameter than the front wheels, and while the reach bar 37 is connected at its rear end to the arch of the axle, a double connection is provided for the front end with the frame 1. This connection, as shown in Figs. 1, 2 and 4, is made at the front of the frame 1 and at the rear. A substantially right angular bracket 38 is arranged at the rear of the frame, the said bracket having bearings at one of its straight sides, which are adapted to engage a shaft 39, held in bearings 55 on the frame. At the angle between the other straight side and the inclined side, a hook 50 is provided which engages an eye on a slide 51 mounted to move in the longitudinally extending slot in the reach bar, and the slide is held in adjusted position in the slot by the set screw shown.

At the front of the frame, the reach bar has a threaded stem 56 which passes through a longitudinally extending slot in the front of the frame, and is engaged by a nut to adjustably connect the front end with the front of the frame. At the rear end the bracket plate 41 has a coupling pin which passes downward through an opening in the reach bar 37 and is of channel material arranged with the channel downward and then forward beneath the side walls of the channel as shown. A seat 42 is connected with the axle and bracket plate 41, by means of a seat plate 43, and the bracket plate 33 upon which the inner section of the steering post is mounted, extends forwardly from the seat. The steering post 31—32 is not only rotatable to steer the tractor, but in addition is movable longitudinally to permit the direction of rotation of the wheels 4 to be changed, that is, to reverse the direction of motion of the tractor. As shown, the socket 30 is slidable on the polygonal portion 29, and the said socket has a pair of annular ribs spaced apart from each other to form an annular passageway 44 between them. This passageway is engaged by a pin on the end of an arm 45, which extends laterally from a lever 46 pivoted at 47 to the frame and having a pin for engaging an annular groove in the clutch sleeve 12 before mentioned. This arm 45 is rigid with the lever 46, and it will be evident that when the steering post is pulled rearwardly, the lever 46 will be swung to move the clutch sleeve 12 in a direction to clutch the bevel gear $9^a$ to the counter-shaft 10.

When so connected, the driving shaft 6 will be driven in one direction, while when the bevel gear 9 is connected to the said shaft, the driving shaft 6 will be driven in the opposite direction. Thus the driver seated at 42 may guide the tractor and may reverse the same. Cultivating mechanism, as for instance, disk harrows 48, may be connected with the bracket plate 41. As shown these harrows are connected with the shaft 52 which is held in a clip 53 adjustably connected with the bracket plate by means of the connection indicated at 54.

The improved tractor may be easily connected to any farm implement or vehicle, and while the steering device is controlled from the trailing truck, it is supported by the motor truck. The pull upon the power wheels is near the central plane, as will be noticed from an inspection of Fig. 4 and spaced inwardly from the periphery, thus insuring an even pull and eliminating side draft. The worm gear steering connection provides a positive lock for the parts in any position. A controlling wheel for the steering and for the reversing mechanism, is placed before the operator's seat in a convenient position to be handled by the operator. The tractor is of such width that it may run astride two rows when used with a two row cultivator.

It will be noticed from an inspection of Fig. 4, that the shaft or rod 39 is journaled in bearings 55 on the rear side of the frame 1. Three sets of bearings are provided, a central and two lateral, the lateral being spaced an equal distance from the central bearing. The rod or shaft 39 which supports the right triangular frame 38 may be removed, and the frame and pin may be transferred to the opposite side of the central bearing. If the frame is reversed, that is arranged with the vertical side inward, in the same manner as shown in Fig. 4, the reach bar will be slightly moved to the left, however, if the frame is not reversed but arranged with the vertical side outside, the reach bar and the trailing truck will be shifted to the left. In the same manner by reversing the arrangement of the frame 38, that is by turning the vertical side to the left, the reach bar and trailing truck may be shifted to the right.

The tractor consists of the frame 1, the front wheels and the reach bar, the rear or trailing truck representing the implement or vehicle to be drawn, and in practice the draw bar 37 may be connected directly with such vehicle or implement. The shiftable reach or draw bar is provided for permitting the drive wheels to be clear of the growing crops and also to permit the tractor to be hitched easily to any machine or implement. The rear or trailing truck is used with the tractor only when moving the tractor from one machine or implement to another. The shaft 10 is provided with a belt wheel 56, and it will be evident that by means of this wheel the motor may drive an implement, as well as draw the same, or the motor may be used as a motor disconnected from the driving mechanism. It will be noticed that the polygonal portion of the shaft 10, upon which the pinion 16 is mounted, is of sufficient length to permit the said pinion to be moved laterally out of engagement with the gear wheel 17.

I claim:

1. A tractor comprising a frame having pivoted to each end thereof a spindle, a power wheel journaled on each spindle and having an internal gear ring, a driving shaft journaled on the frame, pinions connected to the end thereof by universal joints and engaging the gear teeth, a counter-shaft journaled on the frame and having a driving connection with the driving shaft, a motor on the frame having its shaft at right angles to the counter-shaft, bevel gear wheels journaled loosely on the counter-shaft on opposite sides of the motor shaft, a clutch sleeve feathered on the shaft between the bevel gears, and adapted to clutch either gear to the counter-shaft, means for simultaneously swinging the spindles to steer the tractor, a reach bar connected with the frame, a trailing truck connected with the reach bar, and a steering post for operating the steering mechanism and movable longitudinally with respect to the steering mechanism, and means in connection with the steering post and the clutch sleeve for operating the said clutch sleeve when the steering post is moved longitudinally.

2. A tractor comprising a frame having pivoted to each end thereof a spindle, a power wheel journaled on each spindle and having an internal gear ring, a driving shaft journaled on the frame, pinions connected to the end thereof by universal joints and engaging the gear teeth, a counter-shaft journaled on the frame and having a driving connection with the driving shaft, a motor on the frame having its shaft at right angles to the counter-shaft, bevel gear wheels journaled loosely on the counter-shaft on opposite sides of the motor shaft, a clutch sleeve feathered on the shaft between the bevel gears, and adapted to clutch either gear to the counter-shaft, and means for simultaneously swinging the spindles to steer the tractor, means for operating the steering mechanism, and a connection between the said means and the clutch for permitting the same means to operate the clutch.

3. A tractor comprising a supporting frame for a motor and having pivoted to the ends thereof spindles, wheels journaled on the spindles, a driving shaft journaled on the frame and having a driving connection with the wheels and movable with the wheels, a counter-shaft, a motor, means for connecting the shaft with the motor to operate the said shaft in either direction, a driving connection between the counter-shaft and the driving shaft, means for simultaneously swinging the wheels, and a common means for operating the swinging means and the connecting mechanism of the counter-shaft, a reach bar pivoted to the frame for connection with the vehicle or implement to be drawn, and a trailing truck for supporting the reach bar during movement of the tractor.

4. A tractor comprising a supporting frame for a motor and having pivoted to the ends thereof spindles, wheels journaled on the spindles, a driving shaft journaled on the frame and having a driving connection with the wheels and movable with the wheels, a counter-shaft, a motor, means for connecting the shaft with the motor to operate the said shaft in either direction, a driving connection between the counter-shaft and the driving shaft, means for simultaneously swinging the wheels, and a common means for operating the swinging means and the connecting mechanism of the counter-shaft.

5. A tractor comprising a frame, having spindles pivoted to the ends thereof and power wheels journaled on the spindles, a counter-shaft having a driving connection with the wheels, oppositely arranged bevel gears journaled loosely on the shaft and adapted for connection with a motor, a clutch sleeve feathered on the shaft between the gears for connecting either to the shaft, steering mechanism for steering the wheels, a steering post for operating the steering mechanism, said shaft being sectional and the sections being movable with respect to each other, one of the sections having means in connection therewith for operating the clutch when the said section is moved toward and from the other section.

6. In a tractor, the combination with the tractor truck comprising a frame having spindles pivoted at the end thereof and wheels journaled on the spindles, means for driving the wheels, and means for simultaneously swinging the wheels, a draw bar or reach bar connected with the frame, a supporting frame hinged to the rear of the truck frame and depending therefrom and having a connection with the reach bar, said frame being adjustable to either side of the frame.

WILLIAM SAVIDGE.